(12) United States Patent
Vitale et al.

(10) Patent No.: US 7,995,038 B2
(45) Date of Patent: Aug. 9, 2011

(54) SOFTWARE FLOW CONTROL OF ROTARY QUAD HUMAN MACHINE INTERFACE

(75) Inventors: Robert L. Vitale, Macomb Township, MI (US); Joseph F. Szczerba, Grand Blanc, MI (US); John K. Lenneman, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 803 days.

(21) Appl. No.: 11/864,166

(22) Filed: Sep. 28, 2007

(65) Prior Publication Data

US 2009/0085880 A1    Apr. 2, 2009

(51) Int. Cl.
 *G06F 3/041* (2006.01)
 *G06F 3/033* (2006.01)
 *G06F 7/00* (2006.01)
 *B60Q 1/00* (2006.01)
(52) U.S. Cl. ............ 345/173; 345/184; 340/461; 701/36
(58) Field of Classification Search .......... 345/156–184; 700/17, 83; 340/438–441, 449, 453, 459, 340/461, 691.6; 701/36, 70, 200, 211
See application file for complete search history.

(56) References Cited

U.S. PATENT DOCUMENTS

| 4,809,177 | A | * | 2/1989 | Windle et al. ................ 701/1 |
| 6,529,125 | B1 | * | 3/2003 | Butler et al. ................ 340/461 |
| 6,968,918 | B2 | * | 11/2005 | Chernoff et al. ............. 180/313 |
| 7,038,147 | B2 | | 5/2006 | Sasanouchi et al. |
| 7,154,483 | B2 | * | 12/2006 | Kobayashi ................ 345/173 |
| 2005/0280524 | A1 | | 12/2005 | Boone et al. |
| 2006/0017585 | A1 | * | 1/2006 | Lenneman et al. ........ 340/691.6 |
| 2006/0227065 | A1 | | 10/2006 | Yukawa et al. |
| 2007/0069914 | A1 | * | 3/2007 | Lenneman et al. ........ 340/691.6 |

* cited by examiner

*Primary Examiner* — Bipin Shalwala
*Assistant Examiner* — Keith Crawley
(74) *Attorney, Agent, or Firm* — John A. Miller; Miller IP Group, PLC (57) ABSTRACT

A rotary quad control interface that allows a vehicle driver to control several vehicle systems without focusing on the interface itself. The interface includes four touch pads disposed in four quadrants of the interface, an outer rotary dial positioned substantially at the center of the four touch pads and an inner rotary dial disposed within the outer rotary dial and being concentric thereto, where the inner rotary dial also operates as a push button. A display screen displays the operation of the interface, and includes a first display portion, a second display portion, a third display portion and a fourth display portion that are provided as quadrants on the display screen and are representative of the touch pads on the interface.

21 Claims, 11 Drawing Sheets

SOFTWARE FLOW CONTROL OF ROTARY QUAD HUMAN MACHINE INTERFACE

BACKGROUND OF THE INVENTION

1. Field of the Invention

This invention relates generally to a control interface for controlling various passenger systems in a vehicle and, more particularly, to a reduced complexity software flow control design for a rotary quad human machine interface that controls several occupant systems in a vehicle.

2. Discussion of the Related Art

A vehicle typically includes various components and systems that are designed to enhance the comfort and convenience for the driver and passengers of the vehicle. These systems include, for example, audio systems, such as radio, compact disc player, DVD, cassette player, MP3, etc, climate control systems, including heating, ventilation and air conditioning, navigation systems, date and time displays, etc. Each of these systems typically includes a control interface through which the driver or other occupant of the vehicle can control and adjust the system parameters. Various types of control interfaces are known in the art for these types of systems, such as switches, buttons, dials, touch screens, voice recognition devices, etc.

U.S. Patent Publication 2006/0017585 to Lenneman et al., assigned to the assignee of this application and herein incorporated by reference, discloses a multifunction control system for a vehicle including four touch pads separated into quadrants and having two concentric rotary dials at the middle of the quadrants, where the center rotary dial also operates as a push button. A display is associated with the control system that displays the various system parameters in response to activation of the touch pads and rotary dials so that the driver can visually see the selected parameters. It would be desirable to simplify the software flow control of such a multifunction quad-based interface.

SUMMARY OF THE INVENTION

In accordance with the teachings of the present invention, a rotary quad control interface is disclosed that allows a vehicle driver to control several vehicle systems without focusing on the interface itself. The interface includes four touch pads disposed in four quadrants of the interface, an outer rotary dial positioned substantially at the center of the four touch pads and an inner rotary dial disposed within the outer rotary dial and being concentric thereto, where the inner rotary dial also operates as a push button. A display screen displays the operation of the interface, and includes a first display portion, a second display portion, a third display portion and a fourth display portion that are provided as quadrants on the display screen and are representative of the touch pads on the interface. The display screen further includes an inner center portion being representative of the inner rotary dial and an outer center portion being representative of the outer rotary dial. The display screen can display a plurality of control modes where predetermined information is displayed in the first, second, third and fourth display portions and in the inner center portion and the outer center portion that identifies to the user which of the plurality of vehicle systems can be controlled by the interface. The driver can touch the touch pads when the screen is a main screen display to cause the display screen to go to a particular one of the control modes so that system can be controlled.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a flow control scheme for a user control interface for controlling various vehicle systems is merely exemplary in nature, and is in no way intended to limit the invention or its applications or uses.

Figure 1:
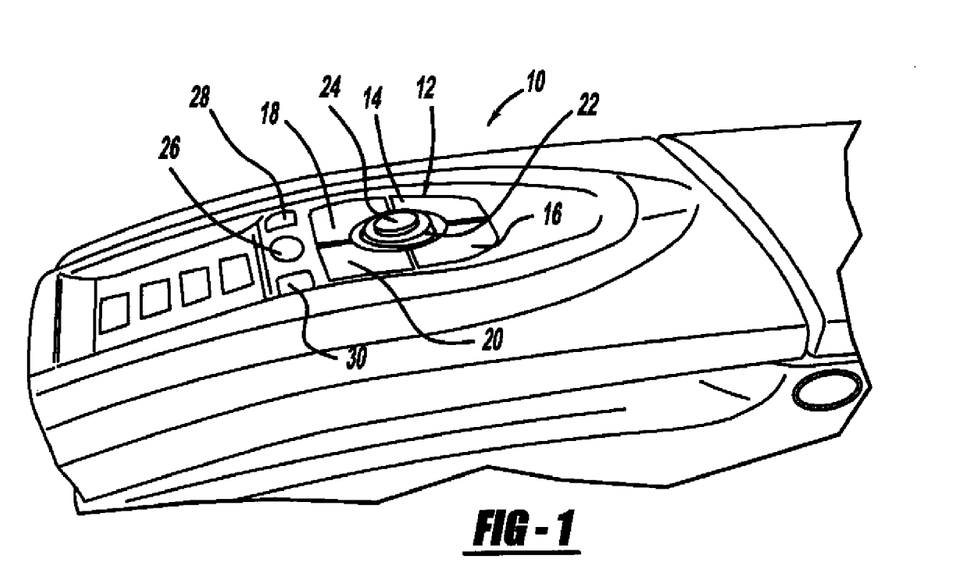
FIG. 1 is a perspective view of a center console in a vehicle that includes a rotary quad control interface, according to an embodiment of the present invention.
Figure 2:
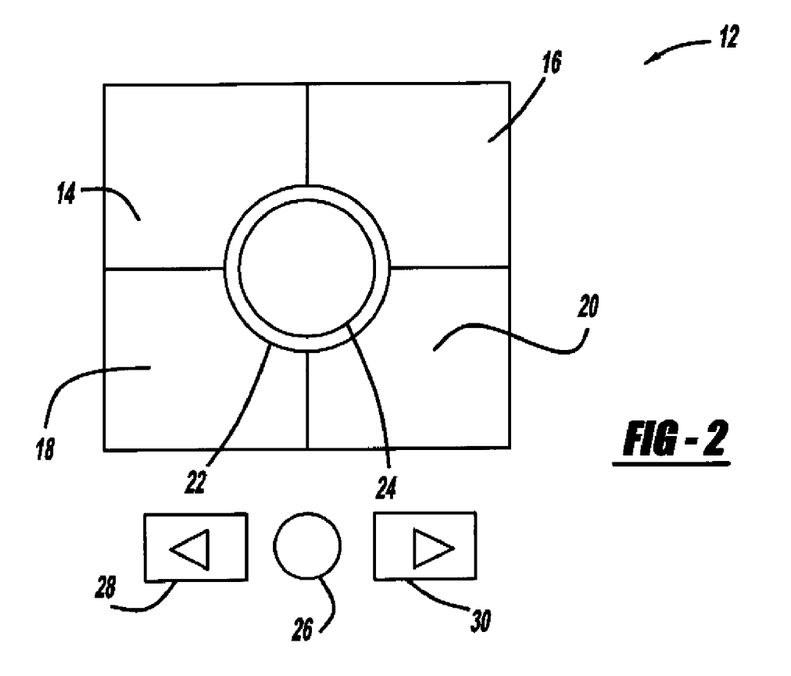
FIG. 2 is a top view of the rotary quad control interface shown in FIG. 1 separated from the vehicle center console.

FIG. 1 is a perspective view of a center console 10 of a vehicle including a rotary quad interface 12 for controlling various vehicle systems, according to an embodiment of the present invention. FIG. 2 is a top view of the rotary quad interface 12 separated from the center console 10. The interface 12 includes four separated touch pads 14, 16, 18 and 20 positioned as quadrants and disposed around an outer concentric rotary dial 22 and an inner concentric rotary dial 24, where the inner dial 24 also operates as a pushbutton. The interface 12 also includes three other pushbuttons including a home button 26, a left button 28 and a right button 30. The interface 12 is positioned in the console 10, and is configured in a manner as discussed herein so that the vehicle driver is able to operate the controls of the interface 12 without necessarily have to look at the interface 12. This allows the driver to remain focused on the driving task and not on the interface 12.

Figure 3:
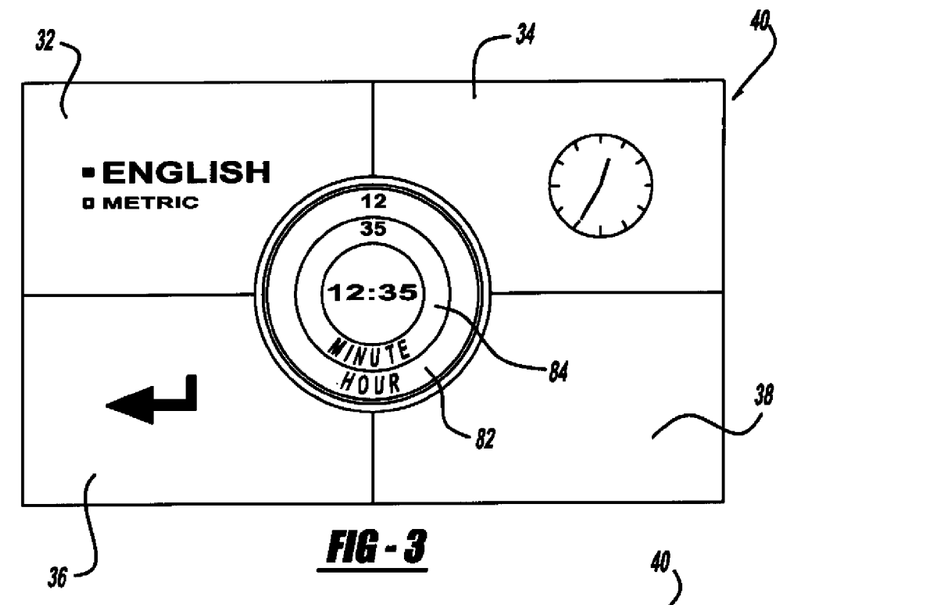
FIG. 3 is a front view of a display screen associated with the interface that shows the interface in a set-up mode.

In order to better accomplish this, a display screen is provided on the vehicle dashboard at a location where a vehicle driver can see the display screen without being distracted from the driving operation. FIG. 3 is a front view of such a display screen 40 that displays a representation of the interface 12. As will be discussed in detail below, the display screen 40 provides a display of the interface 12 so that the driver can tell what the various buttons and dials on the interface 12 are used for when the system is in a certain control mode. As will be appreciated by those skilled in the art, the specific buttons and dials used for a particular system control is merely exemplary in that the interface 12 can be programmed in many different within the scope of the invention.

As will be discussed in detail below, the display screen 40 displays various parameters for the several vehicle systems that the interface 12 controls depending on which mode the interface 12 is currently in. As mentioned above, the display screen 40 will be positioned at a suitable location, generally on the vehicle dashboard, that allows the driver to see the display screen 40 without having to remove his or her eyes from the road. This is accomplished because the display screen 40 is set up to match the various inputs of the interface 12. Particularly, the touch pad 14 is displayed at an upper left quadrant 32 of the display screen 40, the touch pad 16 is displayed at an upper right quadrant 34 of the screen 40, the touch pad 18 is displayed at a lower left quadrant 36 of the display screen 40 and the touchpad 20 is displayed at a lower right quadrant 38 of the screen 40. The outer rotary dial 22 is displayed at an outer central circular location 82 and the inner rotary dial 24 is displayed at an inner central circular location 84.

FIG. 3 shows the display screen 40 in a set-up mode. In this non-limiting embodiment, the driver can put the system into the set-up mode by simultaneously pushing and holding the home button 26 for a predetermined time, such as three seconds. In the set-up mode, the display screen 40 shows that the touch pad 14 is used to select either English or metric units, the touch pad 16 is used to select clock settings and the touch pad 18 is used to select a back control. Further, the outer dial 22 is used to change the hours of the clock and the inner dial 24 is used to change the minutes of the clock, where the clock time is displayed digitally in the center location 84.

Figure 4:
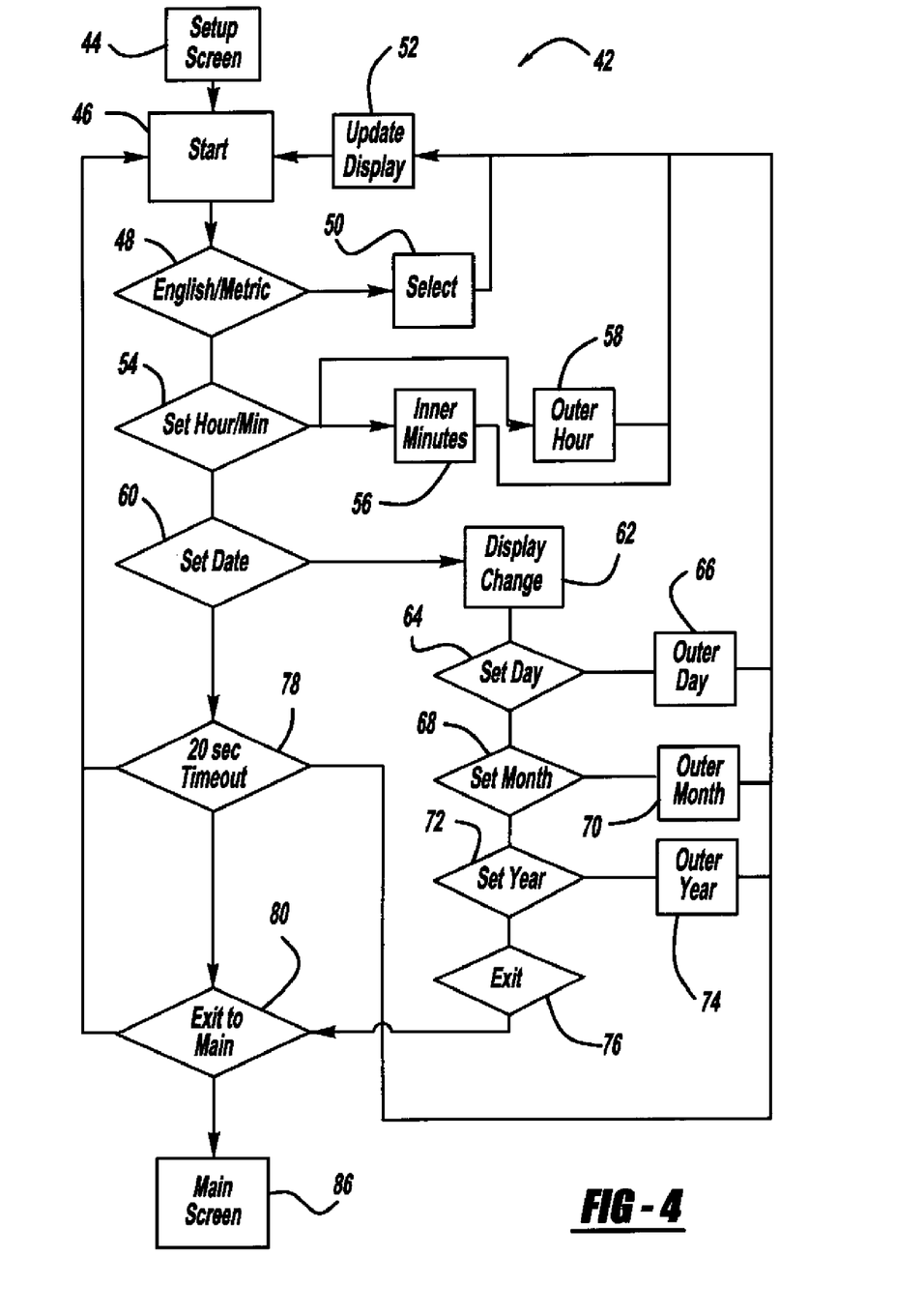
FIG. 4 is a flow chart diagram showing a process for setting up the control interface to display the time and date on the display screen.

FIG. 4 is a flow chart diagram 42 showing a process for setting the time and date when the interface 12 is in the set-up mode at box 44. The driver can push the touch button 14 to start the set-up process at box 46, and then select either English or metric units at diamond 48 by touching the button 14 to switch back and fourth between English and metric units at box 50. The display screen 40 is updated in the quadrant 32 at box 52 when the units are changed.

The driver can set the hours and minutes of the clock by touching the touch pad 16 at diamond 54. When the system is in the clock set-up mode, the driver can change the minutes by rotating the inner dial 24 at box 56 and change the hours by rotating the outer dial 22 at box 58. The driver can then set the date at diamond 60 by touching the touch pad 20 to put the system in the date select set-up mode. When the touch pad 20 is touched the first time, the driver can set the day at diamond 64 by rotating the outer dial 22 at box 66. The driver can then touch the touch pad 20 a second time at diamond 68 to allow the month to be set by rotating the outer dial 22 at box 70. The driver can then set the year by touching the touchpad 20 a third time at diamond 72 and changing the year by rotating the outer dial 22 at box 74. Each time a change is made, the display screen 40 it is updated at the box 52. If the driver touches the touchpad 20 a fourth time, the system exits the date set-up at diamond 76. The control for setting up the date and time has a predetermined time out, such as 20 seconds, in one non-limiting embodiment, at diamond 78 in that if the driver does not continue making selections and changes using the interface 12, as discussed herein, the display screen 40 will revert to the main screen at diamond 80 and box 86.

Figure 5:
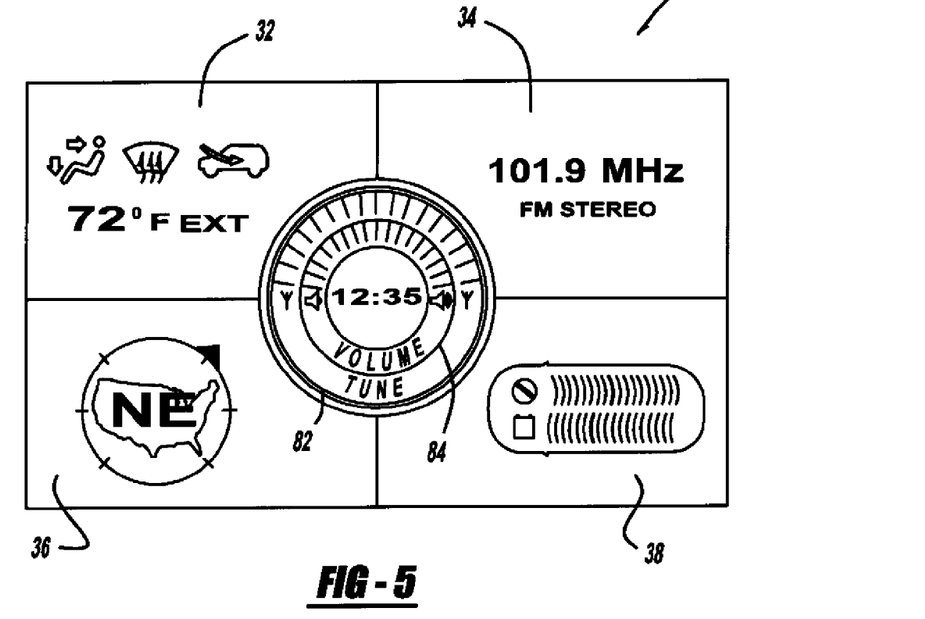
FIG. 5 is a front view of the display screen showing the screen in a main or default position.

FIG. 5 is a front view of the display screen 40 showing the main screen or default position where climate control information is shown in the upper left quadrant 32, audio information is shown in the upper right quadrant 34, compass heading is shown in the lower left quadrant 36 and vehicle feature control is shown in the lower right quadrant 38. In the default position, the outer rotary dial 22 is used for audio tuning control and the inner rotary dial 24 is used for controlling audio volume.

Figure 6:
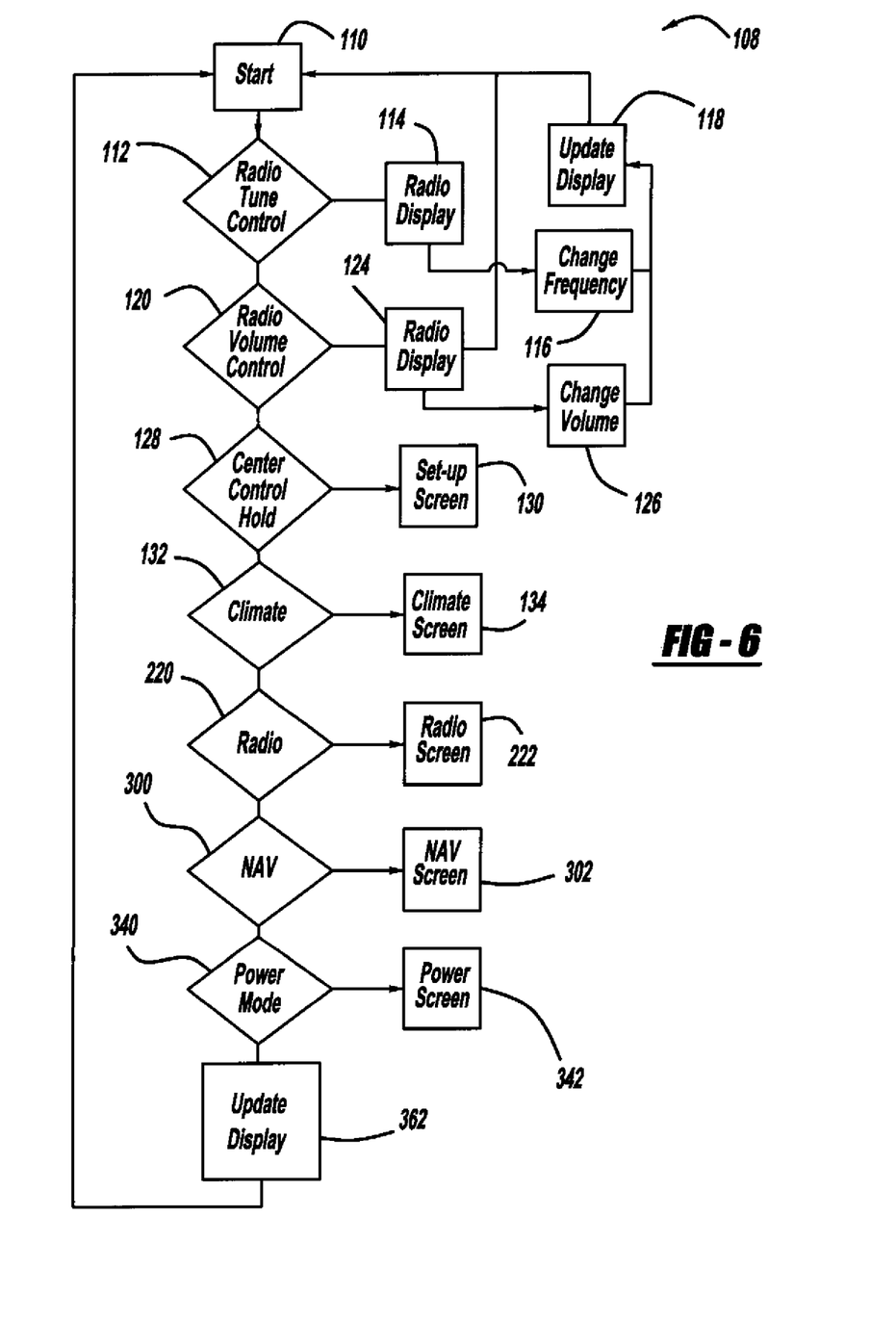
FIG. 6 is a flow chart diagram showing a process for selecting the control of various vehicle systems from the main screen.

FIG. 6 is a flow chart diagram 108 showing interface control when the display screen 40 displays the main screen. The process starts at box 110 from where the driver can provide basic radio and audio adjustments to the audio system. More in-depth setting changes of the audio system are provided from a radio display screen, discussed below. The driver can change the radio frequency at diamond 112, which is displayed in the quadrant 34 at box 114 of the main screen, using the rotary dial 22, where the frequency is changed at box 116. The quadrant 34 is then updated at box 118. Further, the driver can change the radio volume at diamond 120, which is displayed in the center location 84, at box 124 using the rotary dial 24, where the volume is changed at box 126 and the display screen 40 is updated at the box 118. Also, from the main screen, the driver can press and hold the home button 26 at diamond 128 to display the set-up screen at box 130 to make set up changes, as discussed above.

Figure 7:
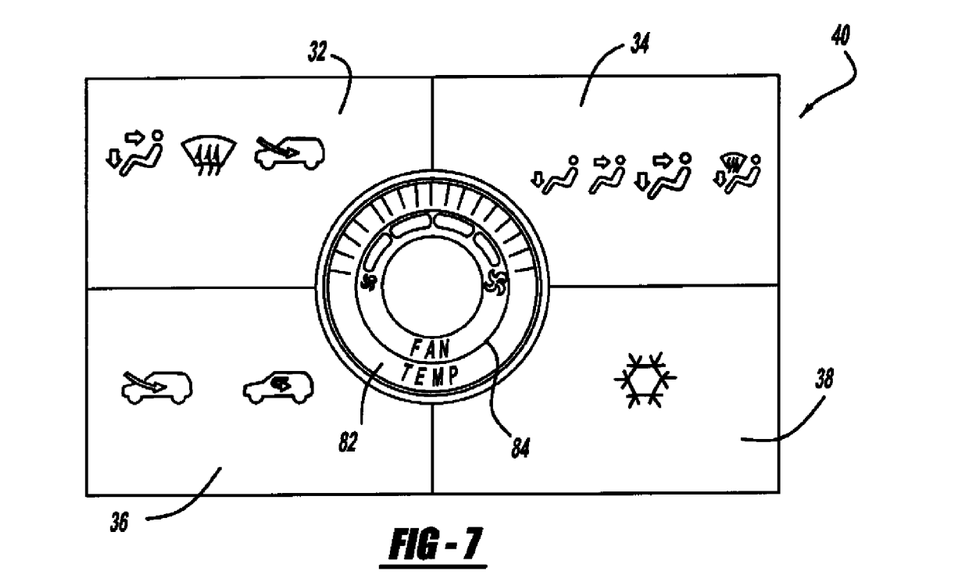
FIG. 7 is a front view of the display screen showing the screen in a climate control mode.

If the driver wants to change the climate control from the main screen, he will touch the touch pad 14 when the display screen 40 is in the main screen position at diamond 132. The climate control screen will now be displayed at box 134, such as shown in FIG. 7. Particularly, the climate control screen shows defrost control in the upper left quadrant 32, vent position in the upper right quadrant 34, air conditioning control in the lower right quadrant 38 and recirculation control in the lower left quadrant 36. Further, fan speed can be controlled by the inner rotary dial 24 that is displayed at the inner location 84 and the temperature can be controlled by the outer rotary dial 22 that is displayed at the outer location 82.

Figure 8:
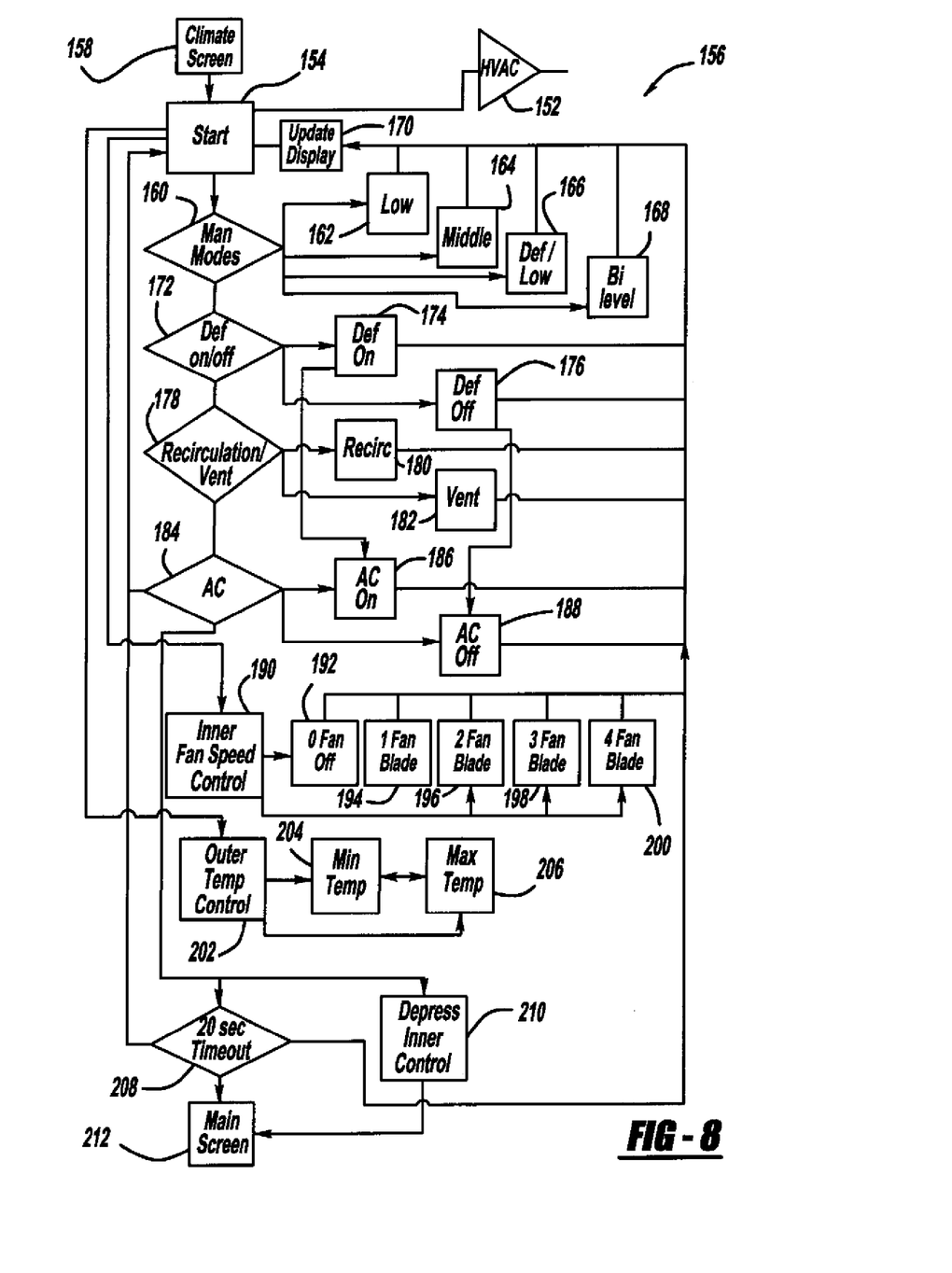
FIG. 8 is a flow chart diagram showing a process for selecting the various parameters for the climate control system of the vehicle.

FIG. 8 is a flow chart diagram 156 showing a control flow for selecting various climate control parameters from the climate control screen. When the display screen 40 is in the climate control mode at box 158 and the driver repeatedly touches the touch pad 16 at diamond 160, where the process has started at box 154 and where the HVAC is controlled by gate 152, the vent positions will be cycled through from a low vent position at box 162, to a middle vent position at box 164, to a defrost and low vent position at box 166 and to a bi-level position 168 each time the driver touches the touch pad 14 in succession. As the driver cycles through by repeatedly touching the touch pad 16, the display screen 40 is updated at box 170; particularly the selected vent position is displayed in the quadrant 34 as being brighter than the other options.

If the driver touches the touch pad 14 when the interface 12 is in the climate control mode at diamond 172, the vehicle defrost can be toggled on and off at boxes 174 and 176, respectively, where the display screen 40 is updated at the box 170, and where the quadrant 32 on the display screen 40 shows whether the defrost is on or off.

The driver can also toggle between recirculation or vent at diamond 178 by touching the touch pad 18 between recirculation on at box 180 and vent on at box 182. The recirculation position is displayed in the quadrant 36 of the display screen 40 as it is updated at the box 170.

The driver can also select between air conditioning off and air conditioning on by touching the touch pad 20 at diamond 184, where touching the touch pad 20 toggles between air conditioning on at box 186 and air conditioning off at box 188. The air conditioning on/off is displayed in the quadrant 38 on the screen 40 as it is updated at the box 170. The air conditioning is also turned on at the box 186 when the climate control is in a defrost on position at the box 174.

The driver can also control the fan speed by turning the inner dial 24 at box 190. In this non-limiting embodiment, the fan has four speeds, where as the driver rotates the dial 24 the fan speed increases or decreases as shown in boxes 192, 194, 196, 198 and 200. As the fan speed is changed, the display screen 40 is updated at the box 170 at the center location 84.

The driver can also select the temperature of the passenger compartment of the vehicle at box 202 by rotating the outer rotary dial 22 between a minimum temperature at box 204 and a maximum temperature at box 206. When the display screen 40 changes at the box 170, the selected temperature will be displayed at the center location 84.

If the driver does not make any changes to the system for the predetermined timeout time, such as twenty seconds, the display screen 40 will automatically revert back to the main screen shown in FIG. 5 at diamond 208 and at box 212. Also the driver can push the center rotary dial 24 at box 210 to immediately return to the main screen at the box 212.

Figure 9:
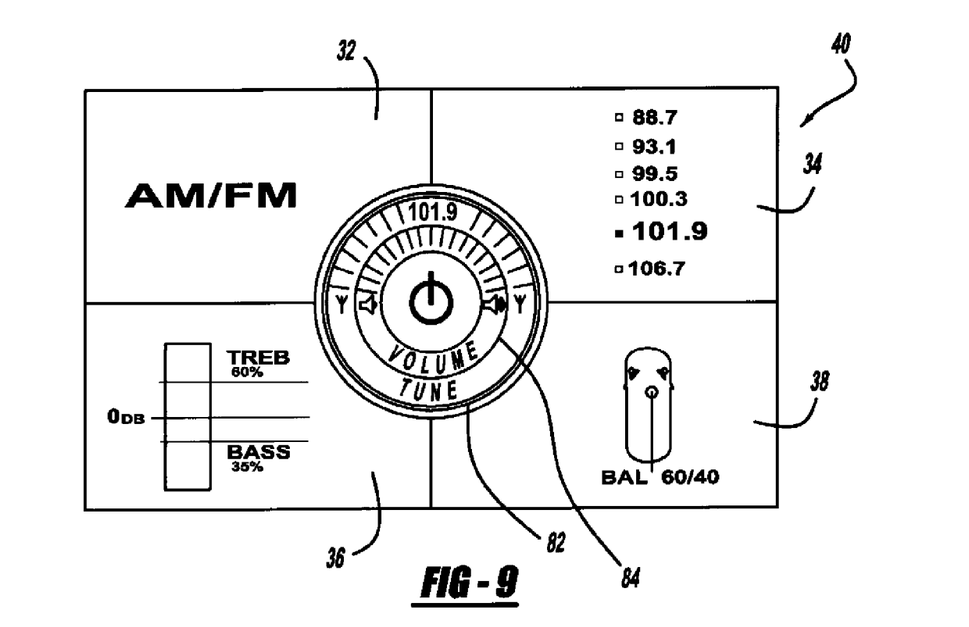
FIG. 9 is a front view of the display screen showing the screen in an audio control mode.

Returning to FIG. 6, when the display screen 40 is in the main screen position, as shown in FIG. 5, the driver may touch the touch pad 16 to provide detailed radio control at diamond 220. If the driver selects the radio control, then the system displays a radio screen at box 222, as shown in FIG. 9. Particularly, the display screen 40 in FIG. 9 shows an AM/FM selection in the upper left quadrant 32, the tuning selection in the upper right quadrant 34, the speaker balance in the lower right quadrant 38 and the treble and bass selection in the lower left quadrant 36. Radio volume is displayed at the inner center location 84 and the tuning is displayed at the outer center location 82.

Figure 10:
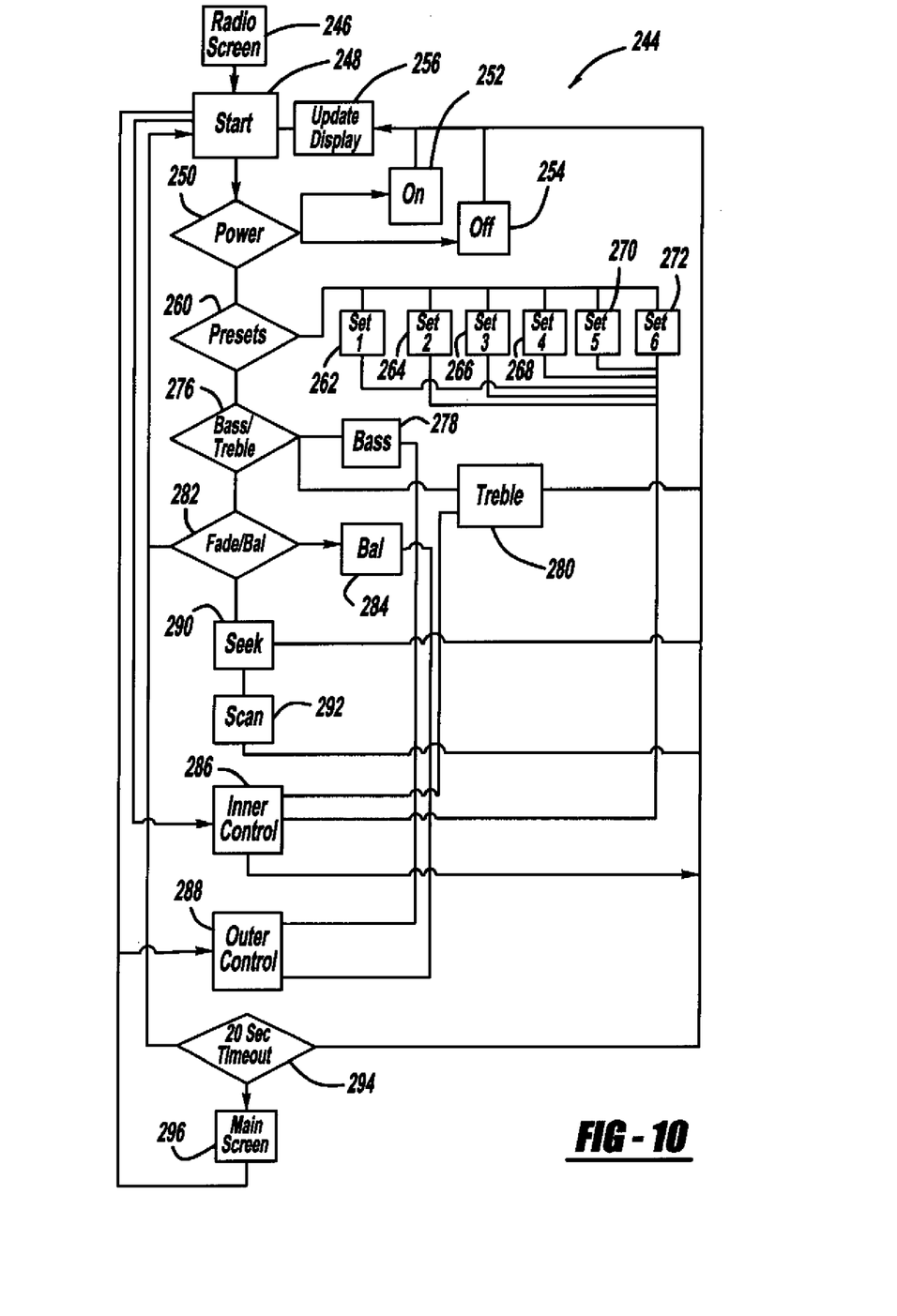
FIG. 10 is a flow chart diagram showing a process for selecting the various audio controls.

FIG. 10 is a flow chart diagram 244 showing a process for controlling the radio, or other audio device, when the radio screen is selected at box 246. The algorithm starts at box 248. By touching the touch pad 14 at diamond 250, the driver can turn on and turn off radio power at boxes 252 and 254, respectively. The display screen 40 in the radio mode is updated at box 256. In alternate embodiments, the touch pad 14 can also be used for other audio systems, such as MP3, CD, DVD, XM, etc.

The driver can also set the frequency presets at diamond 260 by touching the touch pad 16 when a desirable radio station is tuned. Each preset is displayed in the quadrant 34, and the currently selected preset is shown as being brighter than the others. After the presets are set, the inner rotary dial 24 is used to select the desired preset at box 286 where the presets are identified at boxes 262, 264, 266, 268, 270 and 272.

The driver can select equalization between bass and treble at diamond 276 by touching the touch pad 18 when the system is in the radio control mode. In this position, the inner dial 24 can be used at box 288 to adjust the bass at box 278 and the outer dial 22 can be used at box 286 used to adjust the treble at box 280, where the change is displayed in the quadrant 36 at the box 256.

The driver can also change the speaker balance when the system is in the radio control mode by touching the touch pad 20 at diamond 282. The balance between the speakers is adjusted at box 284 by rotating the outer dial 22 at the box 288, which is displayed in the lower quadrant 38 on the screen 40 at the box 256.

Radio seek and scan functions can be selected at boxes 290 and 292, respectively, by selecting the button 30 for the up frequencies and the button 28 for the down frequencies. As above, if the driver does hot take any action for the time-out duration at diamond 294, then the system reverts back to the main screen at box 296.

Figure 11:
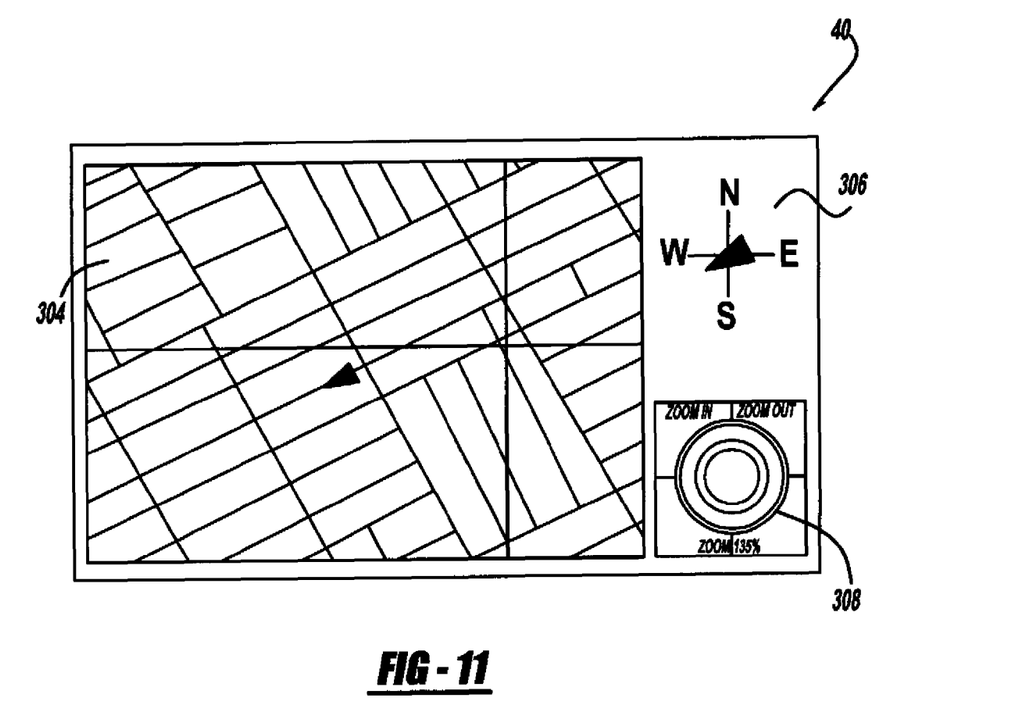
FIG. 11 is a front view of the display screen showing the screen in a navigation mode.

Returning to FIG. 6, from the main screen position the driver can also select a navigation mode at diamond 300 that puts the display screen 40 into a navigation screen at box 302, as shown in FIG. 11. The navigation mode provides a section 304 on the display screen 40 showing map roadways, a section 306 on the display screen 40 showing compass direction and a section 308 on the display screen 40 showing zoom control for the outer dial 22 and the inner dial 24.

Figure 12:
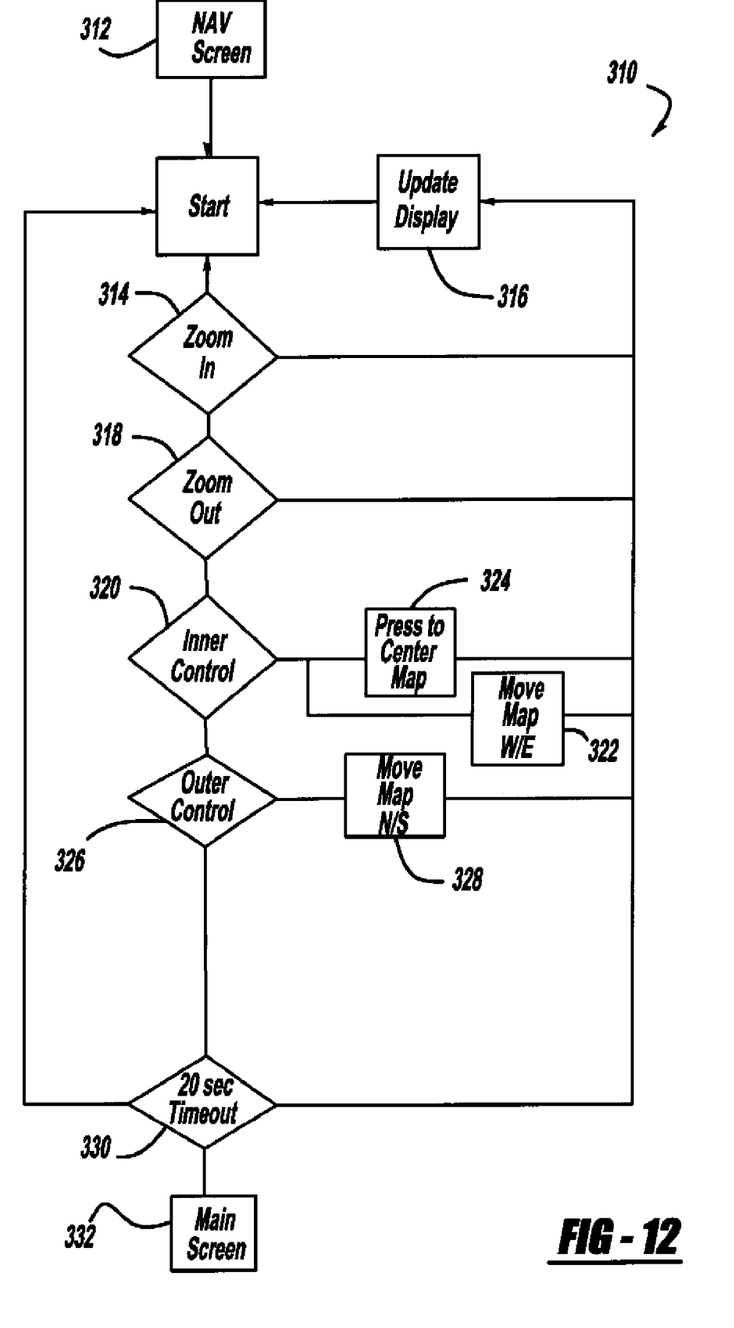
FIG. 12 is a flow chart diagram showing a process for controlling the navigation system.

FIG. 12 is a flow chart diagram 310 showing one process for controlling the navigation mode when the system is in the navigation screen at box 312. At diamond 314, the driver can touch the touch pad 14 to control zoom where the display section 304 will zoom in based on the vehicles location when the display screen 40 is updated at box 316. Also, the driver can use the touch pad 16 to zoom out at diamond 318 that is displayed in the section 304. Alternately, the driver can use the inner dial 24 at diamond 320 to move the map either East or West at box 322. The driver can also press the inner dial 24 to center the map at box 324. The driver can also use the outer dial 22 at diamond 326 to move the map North and South at box 328. If the driver does nothing for the time-out period at diamond 330, the screen 40 will go back to the main screen position at box 332.

Many navigation systems are known in the art that provide routing, points of interest, etc. that can also be programmed into the system and be controlled by the interface 12. In the embodiment discussed above, the touch pads 18 and 20 are not used in the navigation mode. However, they can be programmed to provide various navigation operations when the navigation screen is displayed on the display screen 40, as would be well understood by those skilled in the art.

Figure 13:
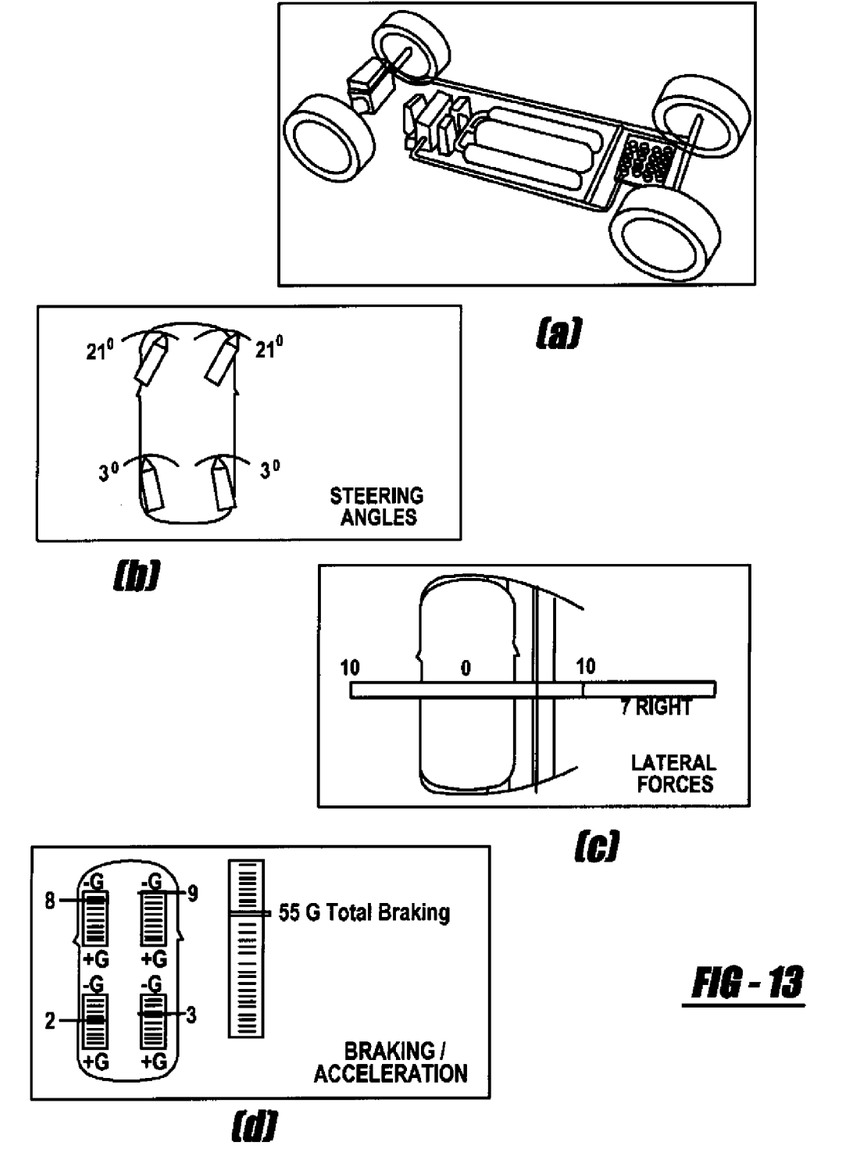
FIGS. 13(a)-13(d) are front views of the display screen showing various vehicle feature modes.
Figure 14:
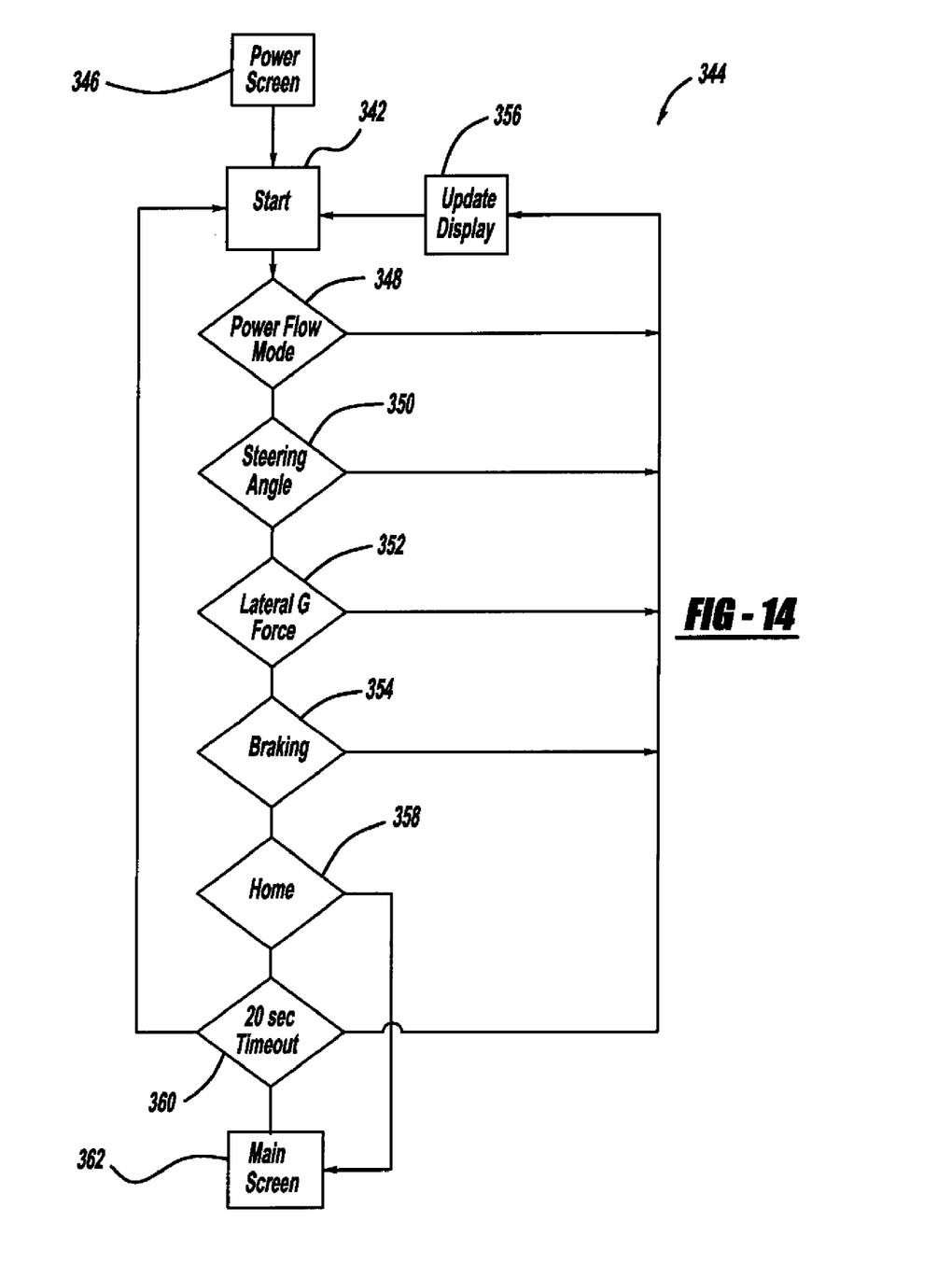
FIG. 14 is a flow chart diagram showing a process for selecting a vehicle feature to be displayed on the display screen.

Returning to FIG. 6, the flow chart diagram 108 depicting the operation of the main screen position in FIG. 5 also includes a vehicle feature selection at diamond 340 where vehicle feature screens can be provided at box 342, such as those shown in FIGS. 13(*a*)-13(*d*). FIG. 14 is a flow chart diagram 344 showing vehicle feature selection using the interface 12 when a vehicle feature is being displayed at box 346. The vehicle feature selection process starts at box 342. After the driver touches the vehicle feature touch pad 20 when the display screen 40 is in the main screen position, the touch pad 14 can be used to display a power flow mode on the screen 40 at diamond 348, such as shown in FIG. 13(*a*), the touch pad 16 can be used to display steering angles on the screen 40 at diamond 350, such as shown in FIG. 13(*b*), the touch pad 18 can be used to display lateral forces on the vehicle on the screen 40 at the diamond 352, such as shown in FIG. 13(*c*), and the touch pad 20 can be used to display braking/acceleration on the screen 40 at diamond 354, such as shown in FIG. 13(*d*). Each time the vehicle feature is changed, the display screen 40 is updated at box 356. The driver can return to the main screen position by touching the home button 26 at diamond 356, or wait for the time-out to occur at diamond 358 to return to the main screen at box 360. Each time a different screen is selected, the display screen 40 is updated at box 362.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A control interface system between a user and a plurality of vehicle systems, said control interface system comprising:
an interface including a plurality of physical touch pads and a plurality of dials, said plurality of dials including an outer rotary dial positioned substantially at the center of the interface and an inner rotary dial disposed within the outer rotary dial and being concentric thereto, said inner rotary dial also operating as a push button;
a display screen for displaying operations of the interface, said display screen including a plurality of display portions, said display portions having a display pad portion, a display dial portion, and a central circle portion with each display pad portion being representative of one of the plurality of physical touch pads and each of the display dial portions being representative of one of the plurality of dials including an inner dial portion being representative of the inner rotary dial and an outer dial portion being representative of the outer rotary dial and a central circle portion being representative of the inner rotary dial operating as a push button; and
a mode control system controlling a plurality of control modes and coordinating the operation of the interface and the display screen, wherein a control mode is displayed as one or more vehicle systems or parameters in the plurality of display portions to identify which of the vehicle systems or parameters are accessed by the physical touch pads and the plurality of dials, wherein one of the control modes is a main control mode, and wherein one of the physical touch pads activates a vehicle climate control system and another one of the touch pads activates a vehicle audio system when the control system is in the main control mode, and wherein one of the control modes is a climate control mode for controlling the vehicle climate control system and another one of the control modes is an audio system control mode for controlling the vehicle audio system, wherein the mode control system is configured so that depressing the physical touch pad that activates the climate control system activates the climate control mode and causes all of the plurality of physical touch pads to control features of the climate control system and depressing the physical touch pad that activates the audio system activates the audio system control mode and causes all of the plurality of touch pads to control features of the audio system, and wherein the display pad portions displays the features for the climate control system or the audio system for the corresponding touch pad.

2. The control interface system according to claim 1 wherein the inner rotary dial controls radio volume and the outer rotary dial controls radio frequency when the control system is in the main control mode.

3. The control interface system according to claim 1 wherein the main control mode displays climate control system parameters in one of the display pad portions, radio settings in another one of the display pad portions and compass readings in another one of the display pad portions.

4. The control interface system according to claim 1 wherein the vehicle systems also include a navigation system having a corresponding control mode.

5. The control interface system according to claim 4 wherein the climate control mode displays the climate control system parameters of vent orientation, defrost orientation, recirculation and air conditioning in the plurality of display pad portions on the display screen where the associated touch pad for the display pad portion controls what is identified in the display portion.

6. The control interface system according to claim 4 wherein the inner rotary dial controls fan speed and the other rotary dial controls interior temperature when the mode control system is in the climate control mode.

7. The control interface system according to claim 4 wherein the audio control mode displays the audio system parameters of AM/FM band, frequency presets, audio bass and treble and speaker balance in the plurality of display pad portions on the display screen where the associated touch pad for the display pad portion controls what is displayed in the display portion.

8. The control interface system according to claim 7 wherein the inner rotary dial controls audio volume and the outer rotary dial controls radio frequency when the mode control system is in the audio control mode.

9. The control interface system according to claim 1 where one of the control modes is a set-up mode where the touch pads and the inner and outer rotary dials are used to set-up the control interface system parameters.

10. The control interface system according to claim 9 wherein English/Metric units are displayed in one of the display pad portions, clock is displayed in another one of the display pad portions, clock minutes is displayed in the inner dial portion and hours is displayed in the outer dial portion, and wherein the associated touch pad for the display portion is used to set up the parameter that is displayed.

11. The control interface system according to claim 1 wherein the main control mode identifies vehicle feature in one of the display pad portions that activates a vehicle feature control mode wherein the vehicle feature control mode has a plurality of vehicle feature screens.

12. The control interface system according to claim 11 wherein the touch pads are used to display different vehicle features when the mode control system is in the vehicle feature control mode.

13. The control interface system according to claim 12 wherein the vehicle feature control mode includes a power flow mode display, a vehicle steering angle display, a lateral force display and a braking/acceleration display.

14. The control interface system according to claim 1 wherein the mode control system has a time-out feature where the mode control system reverts back to the main control mode if the user does not interact with the plurality of physical touch pads or plurality of dials within a predetermined period of time.

15. The control interface system according to claim 1 wherein the interface is positioned in a center console in the vehicle and the display is positioned within a dashboard of the vehicle.

16. The control interface system according to claim 1 wherein the interface has a home button and left and right buttons for providing further system control.

17. A control interface system between a user and a plurality of vehicle systems, said control interface system comprising:
an interface including four physical touch pads disposed in four quadrants of the interface and a plurality of rotary dials, said plurality of rotary dials including an outer rotary dial positioned substantially at the center of the four physical touch pads and an inner rotary dial disposed within the outer rotary dial and being concentric thereto, said inner rotary dial also operating as a push button; and a display screen for displaying operations of the interface, said display screen including a plurality of display portions, wherein the display portions include a display pad portion, a display dial portion and a display central circle portion, said plurality of display pad portions including a first display portion, a second display portion, a third display portion, and a fourth display portion that are provided as quadrants on the display screen and being representative of the corresponding physical touch pad and each of the display dial portions being representative of one of the rotary dials including an inner dial portion being representative of the inner rotary dial and an outer dial portion being representative of the outer rotary dial and the display central circle portion being representative of the inner rotary dial operating as a push button, wherein the display screen displays a plurality of control modes for the vehicle systems, said plurality of control modes including a main control mode and a plurality of other control modes that are displayed in each of the plurality of display portions, wherein each physical touch pad activates the control mode that is displayed in the corresponding display portion on the display screen when the interface system is in the main control mode and when a particular touch pad is depressed when the display is in the main control mode to activate a particular control mode all of the physical touch pads then control features of the activated control mode that are displayed in the display portion.

18. The control interface system according to claim 17 wherein the inner rotary dial controls radio volume and the outer rotary dial controls radio frequency when the display screen displays the main control mode.

19. The control interface system according to claim 17 wherein the main control mode displays climate control system parameters in one of the display pad portions, radio settings in another one of the display pad portions and compass readings in another one of the display pad portions.

20. The control interface system according to claim 17 wherein the displayed vehicle systems include a climate control system, a navigation system and an audio system each having a corresponding control mode.

21. A process for a user to control a plurality of vehicle systems, said process comprising:

showing a main control mode in a display screen having a plurality of display portions where the plurality of display portions include a plurality of display pad portions, a plurality of display dial portions, and a display central circle portion, where the display dial portions includes an inner dial portion and an outer dial portion and where the plurality of display pad portions identify vehicle systems and the display dial portions identify parameters of vehicle systems;

receiving a user indication from an interface, said interface including a plurality of controls, the plurality of controls including a plurality of physical touch pads, an outer rotary dial positioned substantially at the center of the interface, and an inner rotary dial disposed within the outer rotary dial and being concentric thereto, said inner rotary dial also operating as a push button, the said corresponding to display portions with the physical touch pads corresponding to the display pad portion with the inner dial portion corresponding to the inner rotary dial, and the outer dial portion corresponding to the outer rotary dial and the central circle portion corresponds to the inner rotary dial operating as a push button, where said indication is the vehicle system or parameter identified in the corresponding display portion; and processing the user indication to make an adjustment to the parameter of the vehicle system that was indicated; or switching the display screen to the indicated vehicle system's control mode with the plurality of display pad portions identifying parameters of the indicated vehicle system, wherein each physical touch pad activates a control mode that is displayed in a corresponding display portion on the display screen when the interface system is in the main control mode and when a particular touch pad is depressed when the display is in the main control mode to activate a particular control mode all of the physical touch pads then control features of the activated control mode that are displayed in the display portion;

receiving one or more user parameter indications from the interface and processing the one or more user parameter indications by adjusting the parameter of the vehicle system that was indicated; and returning to the main control mode after a period of time with no user parameter indications.

\* \* \* \* \*